US012122146B2

(12) United States Patent
Krümpelmann et al.

(10) Patent No.: US 12,122,146 B2
(45) Date of Patent: Oct. 22, 2024

(54) METHOD FOR AUTOMATED ERROR MANAGEMENT IN A PRINTING MACHINE

(71) Applicant: Windmöller & Hölscher KG, Lengerich (DE)

(72) Inventors: Martin Krümpelmann, Lengerich (DE); Markus Bauschulte, Lengerich (DE); Frank Gunschera, Lengerich (DE)

(73) Assignee: Windmöller & Hölscher KG, Lengerich (DE)

( * ) Notice: Subject to any disclaimer, the term of this patent is extended or adjusted under 35 U.S.C. 154(b) by 0 days.

(21) Appl. No.: 17/769,163

(22) PCT Filed: Oct. 14, 2020

(86) PCT No.: PCT/EP2020/078826
§ 371 (c)(1),
(2) Date: Apr. 14, 2022

(87) PCT Pub. No.: WO2021/074179
PCT Pub. Date: Apr. 22, 2021

(65) Prior Publication Data

US 2024/0109284 A1 Apr. 4, 2024

(30) Foreign Application Priority Data

Oct. 16, 2019 (DE) ..................... 10 2019 127 994.1

(51) Int. Cl.
*B41F 33/00* (2006.01)

(52) U.S. Cl.
CPC ................................ *B41F 33/0036* (2013.01)

(58) Field of Classification Search
CPC .................................................. B41F 33/0036
See application file for complete search history.

(56) References Cited

U.S. PATENT DOCUMENTS 5,187,376 A 2/1993 Hashimoto et al.
6,801,879 B2 10/2004 Chretinat
(Continued)

FOREIGN PATENT DOCUMENTS

DE 102011050733 A1 12/2012
EP 2886345 A1 6/2015

OTHER PUBLICATIONS

International Searching Authority—International Search Report, pertaining to International Application No. PCT/EP2020/078826, dated Dec. 23, 2020, together with the Written Opinion of the International Searching Authority and translation pages of ISR, 12 pages.

*Primary Examiner* — David H Banh
(74) *Attorney, Agent, or Firm* — Sunstein LLP

(57) ABSTRACT

The invention relates to a method for automated error management in a printing machine, wherein a recurring print image is imprinted on a moving material web. To improve automated error management for existing inspection systems, the invention provides a method wherein the print image is acquired by a line scan camera and forwarded to a control unit, in which a print error is recognized in the acquired print image, using an error recognition algorithm, and is saved by the control unit together with a position information and a status information. The position includes at least the margin position of the print error on the material web, and a plurality of recognized print errors are entered by the control unit in a cluster image depending on the position information and the status information, wherein the control unit recognizes an error cluster and error cluster information is output via the error cluster.

3 Claims, 3 Drawing Sheets

(56) References Cited

U.S. PATENT DOCUMENTS

Figure 1:
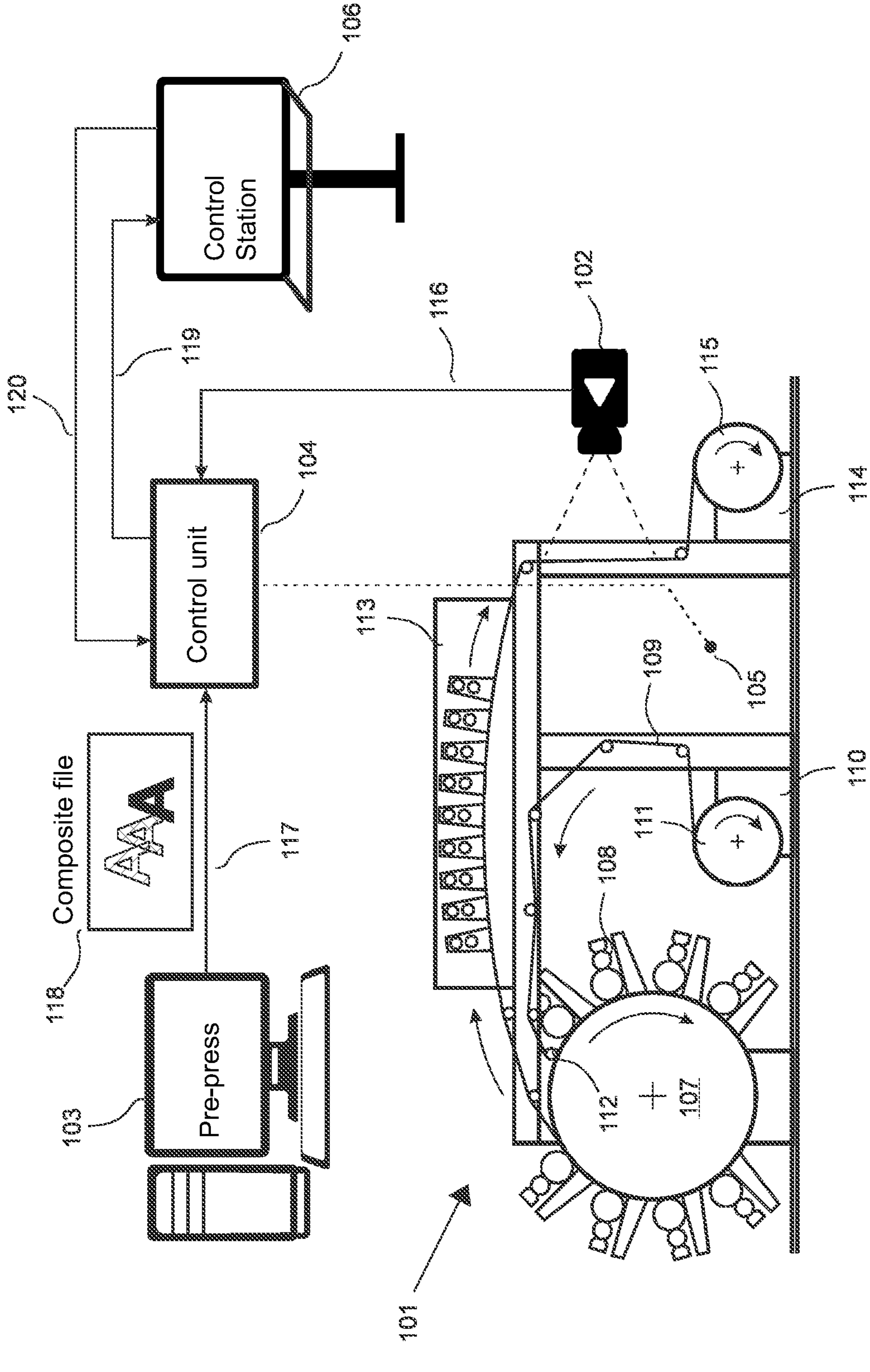

| | | | | |
|---|---|---|---|---|
| 2006/0238780 | A1* | 10/2006 | Dennison | G06K 17/00<br>358/1.9 |
| 2007/0236747 | A1* | 10/2007 | Paul | H04N 1/6033<br>358/3.26 |
| 2008/0013848 | A1* | 1/2008 | Wu | H04N 1/00031<br>382/254 |
| 2009/0002724 | A1* | 1/2009 | Paul | G06K 15/027<br>358/3.26 |
| 2012/0014566 | A1* | 1/2012 | Xu | H04N 1/00084<br>382/112 |
| 2015/0138295 | A1* | 5/2015 | Lindner | B65D 1/0223<br>347/110 |
| 2018/0201011 | A1* | 7/2018 | Efner | B41F 17/006 |

* cited by examiner

METHOD FOR AUTOMATED ERROR MANAGEMENT IN A PRINTING MACHINE

CROSS-REFERENCE TO RELATED APPLICATIONS

This application is the national stage entry under 35 U.S.C. § 371 of International Patent Application No. PCT/EP2020/078826 filed on Oct. 14, 2020, and claims the benefit of German Patent Application No. 10 2019 127 994.1 filed Oct. 16, 2019, the disclosures of which are incorporated herein by reference in their entirety.

The invention relates to a method for automated error management in a printing machine, in which a recurring print image is imprinted on a moving material web.

In this context, error management refers to all actions taken to handle printing errors in the printing machine during the printing process. Error management typically includes three phases, namely error detection (i.e. the determination that an error is present), error diagnosis (i.e. allocation to a specific cause), and the actual error elimination.

So-called inspection systems are used to carry out error management in a printing machine. Such inspection systems are generally designed to enable the operator to observe and control the print image as a stationary image in the ongoing printing process on a monitor. The print image is typically acquired by a line scan camera. In contrast to an area scan camera, the line scan camera only acquires a single image line at a time since this allows for achieving a higher resolution and a higher readout speed compared to an area scan camera. The two-dimensional image is then created based on the movement of the conveyor. However, since this movement is subject to continuous fluctuations, the feed is synchronized via an encoder to prevent image distortions.

As an alternative or in addition to the line scan camera, the inspection system may also feature an area scan camera (also called matrix camera) that acquires a section of the print image on the moving material web. Synchronizing the area scan camera with the recurring print image ensures that a stationary image representing the selected section of the print image is displayed to the operator on the monitor of the control station. Preferably, the selected section is a distinctive area of the print image in which printing errors have a particularly relevant effect. The matrix camera is typically capable of zooming so that faulty or problematic areas of the print image may be examined in high resolution. If the operator detects printing errors in the displayed section (for example, color or register errors), the operator is in a position to readjust the machine parameters (for example the impression setting, the longitudinal register or the lateral register) to correct the printing errors.

Alternatively or in addition to the line scan camera and the area scan camera, the inspection system may further feature an optical spectrometer. An optical spectrometer breaks the light absorbed by a light point into its spectral components and evaluates the result in a computer system. Miniature spectrometers that are installed in a compact housing and may thus be placed in a suitable location within the printing machine are particularly suitable for the applications of the present invention. Such miniature spectrometers generally consist of an aperture (i.e. an entry gap), an optical grating, and an optical sensor. The grating is located behind the aperture and scatters the spectral components of the incident light at slightly varying angles, thus enabling the optical sensor to evaluate the scattered light as light intensity over the wavelength of the respective light components. Such an optical spectrometer is thus capable of monitoring the color components of a pixel within the print image during the printing process and of identifying deviations from a desired color result.

The positions of the errors detected by the operator on the moving material web are saved in the inspection system. After the completion of the printing process, it is then possible, for example with the aid of a rewinder, to move to, and separate the faulty portion of the imprinted material web. It is equally feasible to mark the faulty areas on the material web during printing and to discard them during subsequent processing.

Furthermore, error recognition algorithms are known that are able to automatically recognize specific errors in the print image and to subsequently support the operator in fulfilling his tasks.

For example, an error recognition algorithm may be based on a reference image acquired at the start of the print order. For example, the reference image may be acquired via the line scan camera, the area scan camera, and/or the optical spectrometer at the start of the printing process based on the first print images (for example, the first 50 images), using a process in which these first images are integrated to create the reference image (also called "Golden Image"). In the integration phase, the fluctuation range of the image information may, for example, be determined for each individual pixel to set tolerance limits for error recognition. The currently acquired image is then subtracted from the reference image during the printing process. If the resulting difference is outside of the error tolerances, an error signal is generated, and the faulty image range is displayed on the control station monitor.

Alternatively or additionally, the desired print result may also be specified by means of the so-called digital proof provided by the prepress phase. To determine whether the print result meets the specifications, the image supplied by the inspection system is compared to the digital proof. The digital image processing techniques described above for the reference image may also be used for this comparison.

However, the above-described inspection systems and error recognition algorithms do not yet, or only to a minor extent, enable automatic error management in printing machines. Automatic error management in this context means that the printing machine operator is supported in all three phases of error management. Ideally, the automatic error management will even take over all actions that are required regarding a specific error in the printing machine.

The task of the invention is therefore to improve the automatic error management for existing inspection systems.

This task is solved by the characteristics of claim 1. Further preferred specific embodiments are given in the subclaims.

The attached drawings describe further details and advantages of the invention.

Figure 2:
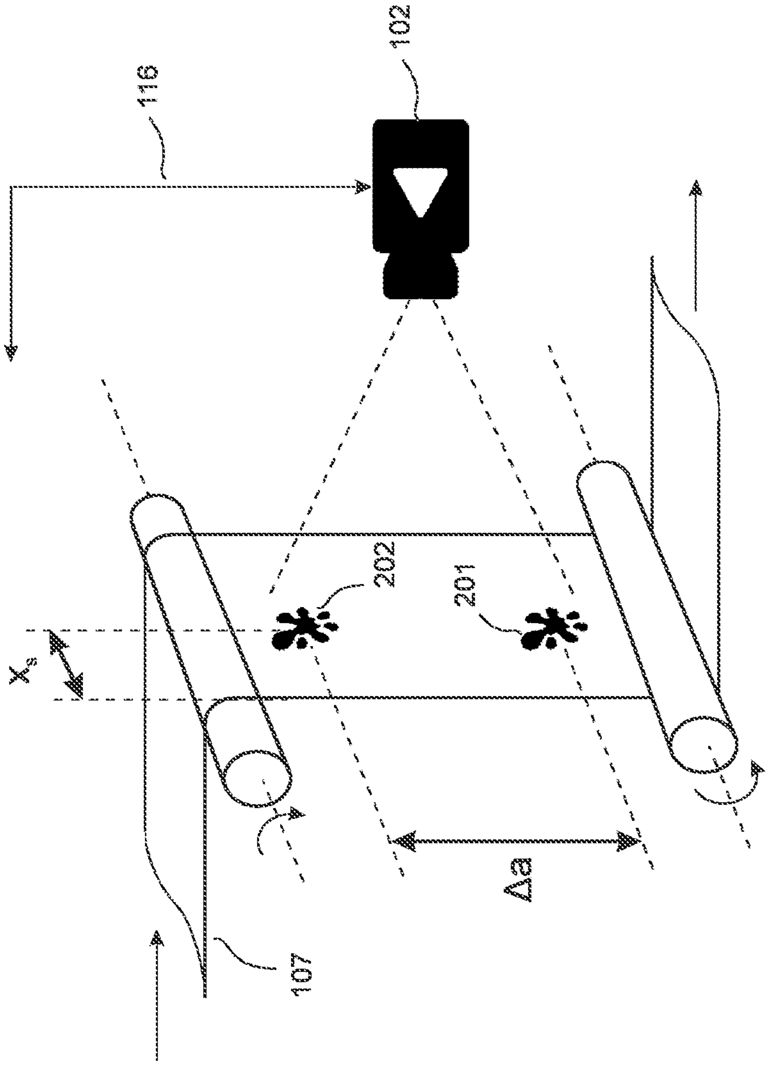
Figure 3:
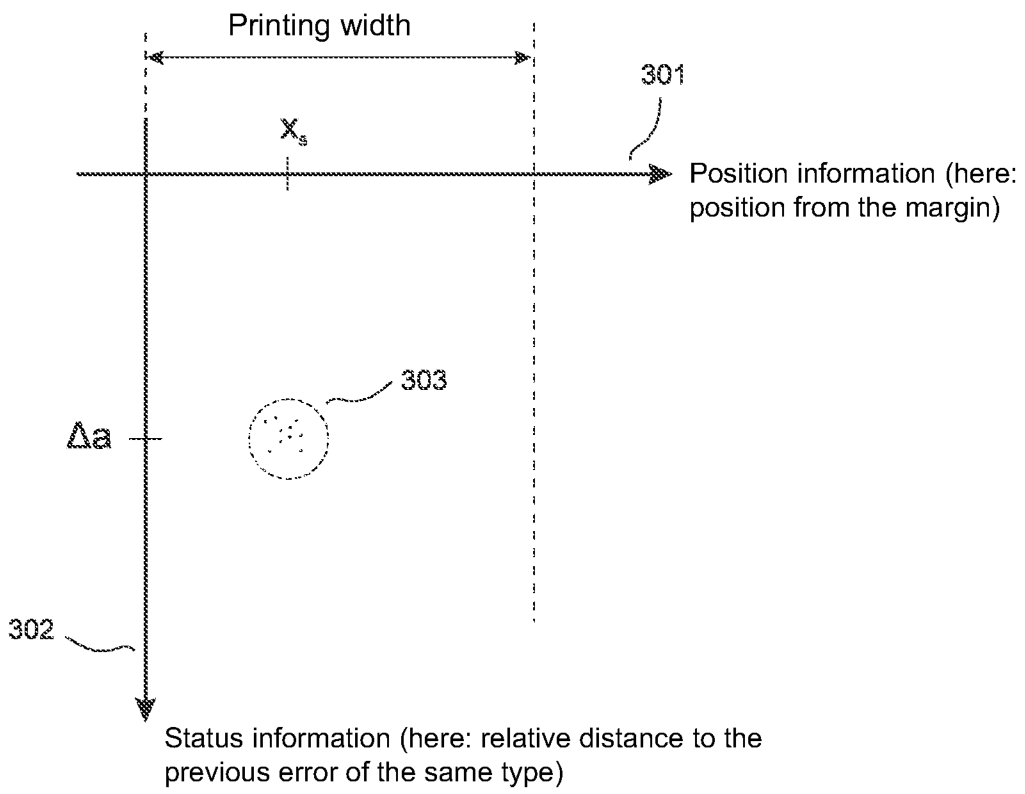

FIG. 1 shows an overall view of the printing machine according to the invention, using the example of a flexographic printing machine, FIG. 2 shows a detail view of FIG. 1 including a line scan camera and a moving material web, and FIG. 3 shows a cluster image by way of example.

FIG. 1 shows an overall view of the printing machine according to the invention, using the example of a flexographic printing machine 101 having a line scan camera 102, a prepress phase 103, a control unit 104, and a control station

106. The control unit is installed at position 105 of the flexographic printing machine 101 and is shown separately for reasons of clarity.

The flexographic printing machine 101 is a so-called color impression machine and thus has a color impression drum 107 around which the eight color decks are installed in a satellite arrangement. Each of these color decks has a plate cylinder, an anilox mandrel and a doctor blade chamber, each of which are mounted on machine-side anchorages. Color deck 108 is labeled with the described components as an example of these eight color decks.

To imprint the material web 109, it is pulled off the material roll 111 in the unwinding station 110 and guided over several deflection rollers to the nip roller 112. The nip roller 112 places the material web 109 on the color impression drum 107 for further transport so that the material web 109 is moved with register accuracy past the color decks and the between-color dryers not shown in detail.

Once the material web 109 has left the color impression drum 107, it is moved through a bridge dryer 113 for drying the ink and is then wound onto the material roll 115 in the rewinding station 114.

The flexographic printing machine also features an inspection system for error recognition. For this purpose, an initial print image 118 (composite file) is saved together with the color separations from prepress 103 in the control unit 104, the prepress being connected to the control unit 104 via the cable. 117. The initial print image 118 is then compared to the actual print image acquired by the line scan camera 102 in the control unit 104, the line scan camera being connect to the control unit 104 via the cable 116.

FIG. 2 shows a detail view of FIG. 1 with a line scan camera and a moving material web. Since the corresponding reference signs were transferred from FIG. 1, reference should be made to the description of FIG. 1.

The method according to the invention is described by way of example in FIGS. 2 and 3:

The material web moving out of bridge dryer 113 was imprinted by the color decks 108 and thus features a recurring print image. The print image is not shown in FIG. 2 for reasons of simplicity. The line scan camera 102 acquires the print image and forwards it to the control unit 104 via cable 116. An error recognition algorithm is implemented in the control unit 104 to recognize printing errors.

If a print error is recognized by the error recognition algorithm, said error is saved by the control unit together with a position information and a status information, the position information including at least the position from the margin of the error on the material web.

Reference sign 201 designates a first print error and reference sign 202 designates a second print error on the moving material web 107, print errors 201 and 202 being of the same type. If the print error is recognized by the error recognition algorithm, the method according to the invention is not limited to merely displaying this error to the operator. Rather, the print error 201 is entered into a cluster image to thus provide an error diagnosis to the operator.

A cluster image as defined by the present invention generally is a multidimensional space, in which the control unit enters the recognized print errors depending on a position information and a status information of the respective print error. FIG. 3 shows a two-dimensional cluster by way of example, in which the margin information of the recognized print error is entered on the horizontal axis 301 and the relative distance to the previous error of the same type is entered on the vertical axis 302. For the print error 202 shown in FIG. 2, the margin distance $x_s$ is thus entered on the horizontal axis, and distance $\Delta a$ is entered on the vertical axis. For specific errors, errors of the same type now form a point cloud, which is referred to as error cluster 303 in the definition of the present invention. Such an error cluster 303 is of major relevance for the operator because it is known that print errors within a cluster are generally caused by defective rollers.

Print errors within a cluster 303 thus are print errors that occur periodically at the same position crosswise to the web. Such errors are generally caused by defective rollers because the periodicity (i.e. the relative spacing of print errors in the movement direction of the web) matches the circumference of the corresponding damaged roller.

Rollers having a direct influence on the print image in a flexographic printing machine include, for example, the plate cylinders, the anilox mandrels, or the impression cylinder. Contamination, mechanical damage, or other irregularities are passed on to the print image during printing and generate the corresponding errors.

If the plate cylinder is the cause of the print error, the print error always appears in the same position in the print image. In that case, every rotation of the plate cylinder generates an error in the print image. The spacing between the errors thus corresponds exactly to the plate length (i.e. the circumference of the plate cylinder).

The situation is different for an anilox mandrel or the impression cylinder. In that case, the print error is only visible in the print image if there is a printable area in the position of the print error. However, the error does not necessarily appear in the print image with every turn of the cylinder. Rather, the relative spacing of the errors corresponds to the circumference of the impression cylinder and thus differs from the print length of the plate cylinder. That means the print error occurs at a different position of the print image.

If the circumferences of the corresponding cylinders are known, the spacing between the errors may be compared to these circumferences. This allows for assigning a cause to the error: If the print has the same periodicity as the longitudinal distance $\Delta a$ and a specific cylinder also has the circumference $\Delta a$, the print error may be assigned to this cylinder.

In the case of the impression cylinder, the cause can thus be clearly identified. Furthermore, it may be feasible to specify the causal location on the impression cylinder based on suitable tracing of the web into the printing machine. If the operator therefore wants to stop the print order, it is further feasible for the control unit to stop the impression cylinder in such a way that the cause of the error on the impression cylinder is easily accessible to the operator.

In general, it is understood that the cluster image according to the invention as shown in FIG. 3 is not limited to the information entered therein. For example, alternative or additional entries on the vertical axis may include the temperature of the impression cylinder, the temperature of the printing ink, the viscosity of the printing ink or other status information. As in the case above, error clusters may also be formed for this status information to serve as the basis of identifying the causes of specific errors.

| List of reference signs | |
|---|---|
| 101 | Flexographic printing machine |
| 102 | Line scan camera |
| 103 | Pre-press phase |
| 104 | Control unit |

-continued

| List of reference signs | |
|---|---|
| 105 | Position of the flexographic printing machine |
| 106 | Control station |
| 107 | Color impression drum |
| 108 | Color deck |
| 109 | Material web |
| 110 | Unwinding station |
| 111 | Material roll |
| 112 | Nip roller |
| 113 | Bridge dryer |
| 114 | Rewinding station |
| 115 | Material roll |
| 116 | Cable |
| 117 | Cable |
| 201 | First print error |
| 202 | Second print error |
| 301 | Horizontal axis |
| 302 | Vertical axis |
| 303 | Error cluster |

The invention claimed is:

1. Method for use in automated error management in a printing machine, the method comprising:

imprinting a recurring print image on a moving material web;

acquiring, by a line scan camera, the print image and forwarding the print image to a control unit, wherein an error recognition algorithm is implemented in the control unit to recognize printing errors;

recognizing, by the control unit, a print error in the acquired print image using the error recognition algorithm and saving, by the control unit, the print error together with a position information and a status information, wherein the position information at least includes a position from a margin of the error on the material web, and wherein the status information comprises at least a relative distance to a previous error of a same type;

entering, by the control unit, a plurality of recognized print errors in a cluster image depending on the position information and the status information; and recognizing, by the control unit, a point cloud of errors of the same type as an error cluster, and outputting error cluster information via the cluster image.

2. The method of claim 1, wherein the cluster image is a two-dimensional coordinate system, wherein the horizontal axis corresponds to margin information of the recognized print errors on the material web and the vertical axis corresponds to the relative distance to the previous error of the same type.

3. The method of claim 2, wherein the error cluster information corresponds to a printing error caused by defective rollers.

* * * * *